United States Patent
Pack

[19]

[11] Patent Number: 6,148,769
[45] Date of Patent: *Nov. 21, 2000

[54] SERIAL CULTURE SYSTEM FOR MICROALGAE, LIVE FOOD ANIMALS AND FISH FRY

[75] Inventor: Moo-Young Pack, Taejon, Rep. of Korea

[73] Assignee: Korea Advanced Institute of Science & Technology, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/119,668

[22] Filed: Jul. 21, 1998

[30] Foreign Application Priority Data

Jul. 25, 1997 [KR] Rep. of Korea ...................... 97-35228

[51] Int. Cl.$^7$ .................................................. A01K 63/00
[52] U.S. Cl. .......................... 119/225; 119/200; 119/215; 119/224
[58] Field of Search ................................... 119/200, 215, 119/217, 218, 224, 225, 230

[56] References Cited

U.S. PATENT DOCUMENTS

| | | | |
|---|---|---|---|
| Re. 30,038 | 6/1979 | Sweeney | 119/212 |
| 3,122,126 | 2/1964 | Yamada | 119/248 |
| 3,763,824 | 10/1973 | Schoon | 119/212 |
| 3,773,014 | 11/1973 | Ewald, Jr. | 119/224 |
| 4,137,868 | 2/1979 | Pryor | 119/212 |
| 4,144,840 | 3/1979 | Bubien | 119/212 |
| 4,213,421 | 7/1980 | Droese et al. | 119/224 |
| 4,250,835 | 2/1981 | Dugan et al. | 119/212 |
| 4,394,846 | 7/1983 | Roels | 119/212 |
| 5,040,486 | 8/1991 | Pack | 119/215 |
| 5,469,810 | 11/1995 | Chiang | 119/248 |

FOREIGN PATENT DOCUMENTS

| | | |
|---|---|---|
| 2 640 468 | 6/1990 | France . |
| 044091 | 9/1991 | Rep. of Korea . |
| 046860 | 12/1991 | Rep. of Korea . |

*Primary Examiner*—Peter M. Poon
*Assistant Examiner*—Judith A. Nelson
*Attorney, Agent, or Firm*—Knobbe Martens Olson & Bear, LLP

[57] ABSTRACT

The present invention provides a compact culture system to produce microalgae, live food animals and fish fry (new born fish) in a serial manner. The culture system is composed of three individual reactors of same size positioned in different levels on three shelves of a frame. In the top-level reactor, microalgae is grown symbiotically with fish. With so grown microalgae, live food animals in the middle-level reactor are fed. Finely, the live food animals are transferred into the bottom-level reactor to feed fry in it. Culture water in the system is self-cleaned by the metabolic activity of the photosynthetic microalgae, and is circulated through the reactors continuously or intermittently. Heaters, thermometers, aerators, illuminators, and water pumps are equipped in the system to offer optimal growth conditions for the organisms. Extra electric outlets are provided for the use of pH-meters, oxygen-meters, carbon dioxide-meters, ammonia-meters when needed to control the water quality.

13 Claims, 3 Drawing Sheets

SERIAL CULTURE SYSTEM FOR MICROALGAE, LIVE FOOD ANIMALS AND FISH FRY

FIELD OF THE INVENTION

The present invention relates to a compact culture system to produce microalgae, live food animals and fish fry in a serial manner, which can replace the conventional large inefficient outdoor ponds and tanks for the said organisms.

BACKGROUND OF THE INVENTION

An effective production of fry is essential for the modern aquaculture business which is growing rapidly throughout the world. The newly born fry having small mouths require rotifers, daphnids, and artemia as live foods for certain stage of growth. Therefore, the capacity of live food production at a farm determines the size of the aquaculture business. The live food animals grow on microalgae. The commercial production of microalgae, however, is not easy and costs highly. In fact, more than 50% of the total production cost of most aquaculture farms has been devoted to the microalgae production.

Carbon dioxide is a main raw material for the microalgal production. Since commercially prepared carbon dioxide is expensive, the carbon dioxide contained in the air is usually used to grow microalgae by blowing air into the culture water. The concentration of the atmospheric carbon dioxide is 0.03% which is only one hundredth of the optimal concentration for the microalgal growth. The suboptimal supply of carbon dioxide reduces the microalgal growth rate, and thus a large culture facility is needed to meet the high demand of microalgae. Five to eight tanks of cultured microalgae are known to be needed to feed one tank of the live food animals.

The present inventor has previously proposed an effective and economical way of microalgal production in U.S. Pat. No. 5,040,486 and in French Patent No. 89 16912. By growing microalgae together with fish in high densities in the same tank, fish provide dissolved carbon dioxide, dissolved ammonia, physical agitation and removal of contaminated protozoa beneficial to microalgae, and microalgae provide consumption of excreted compounds to clean the water beneficial to fish. By increasing the fish density, the carbon dioxide concentration in the culture water can be optimized and the resulted high growth rate allows the culture tank ratio of 1:1 for microalgae and live food animals, respectively.

Microalgae, live food animals and fish fry are small and potentially rapid growing organisms. They may be grown in industrial scale in fermentors like bacteria and yeast with a high efficiency. However, their growth rates depend largely on the environmental conditions, particularly the quality of culture water. The water quality of conventional large outdoor ponds and tanks is hard to control.

SUMMARY OF THE INVENTION

In accordance with the present invention, the capacity of a culture tank is minimized to the controllable size, and with three consecutive reactors a compact system within a frame is established to produce microalgae, live food animals and fish fry in a serial manner under precisely controlled environmental conditions.

A general object of the present invention is, therefore, to provide a compact culture system composed of three reactors of same size positioned three different levels in a frame to produce microalgae, live food animals and fish fry in a serial manner.

A specific object of the present invention is to provide a symbiotic culture reactor which is positioned on the top-level shelve of the frame to receive more natural light, where microalgae, to feed live food animals, is grown together with fish, both in high densities to amplify symbiotic effect between the two kinds of organisms. Self-cleaning of the culture water by the microalgal activity also takes place in this reactor.

Another specific object of the present invention is to provide a culture reactor which is positioned on the middle-level shelve of the frame, where live food animals are grown to feed fry.

The third specific object of the present invention is to provide a culture reactor which is positioned on the bottom-level shelve of the frame, where fry is grown. When fry production is not needed, this reactor and the middle-level reactor can be used to grow larger live food animals such as artemia, or the like, to feed adult fish.

A further object of the present invention is to provide a compact culture system of which the quality of the culture water in the reactors can be controlled easily by minimizing the reactor size to a controllable level. Production of live food animals can be scaled up by increasing the number of the unit culture system.

A further object of the present invention is to provide a compact culture system to make large scale production of live food animals free of climate limitation by installing the culture system in factory buildings or green houses.

A further object of the present invention is to provide a compact culture system of which the costs for product recovery and water circulation to be minimized by positioning the three reactors in three different levels in the frame making a gravitational flow of the culture water possible. The three-level arrangement has space-saving effect also.

Still further object of the present invention is to provide a compact culture system in which a food chain between microalgae, live food animals and fry is established to eliminate routine processes of harvesting and feeding.

The above and further objects and novel features of the invention will more fully appear from the following detailed description when the same is read in connection with the accompanying drawings. It is to be expressly understood, however, that the drawings are for purpose of illustration only and is not intended as a definition of the limits of the invention.

DETAILED DESCRIPTION OF THE INVENTION

Figure 1:
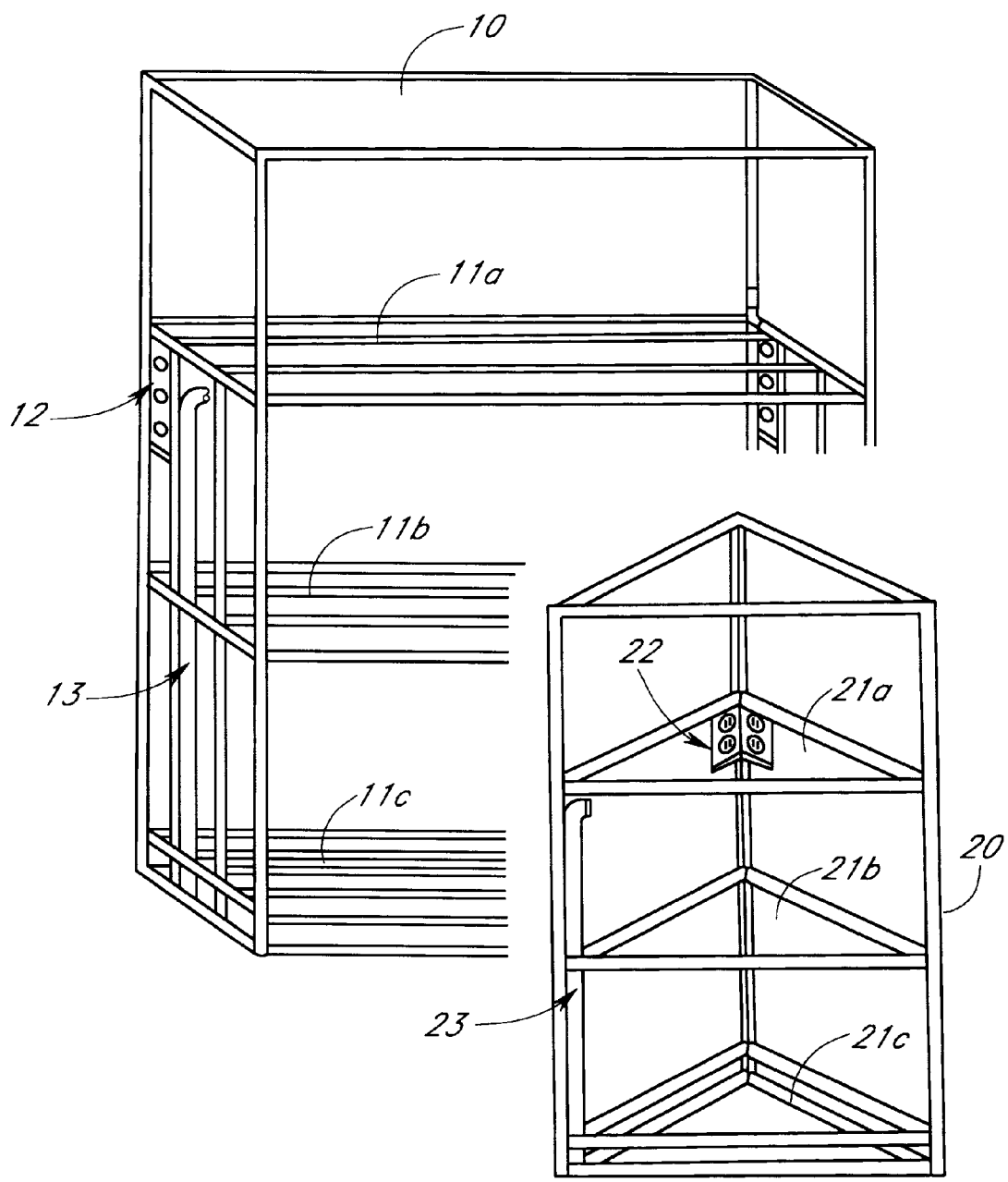
FIG. 1, (10) is a perspective view of a rectangular supporting frame for rectangular reactors, and (20) is a perspective view of a triangular supporting frame for round reactors, both constructed in accordance with the principle of the present invention, FIG. 2, (30) is a perspective view of a rectangular reactor, (40) is a perspective view of a section view of a water-level controller round reactor, and (50) is a vertical installed through a hole provided on the wall of (30) or (40).

As shown in (10) of FIG. 1, the rectangular supporting frame is composed of three shelves of different level on which three rectangular reactors to be installed according to the present invention. In the same figure, (11a) is a top-level shelve on which a rectangular reactor to grow microalgae symbiotically with fish will be installed. The middle-level shelf (11b) is for a rectangular reactor in which live food animals will be grown. Finely, the bottom-level shelve (11c) is for a rectangular reactor to grow fry in it.

The same principle will be applied to the triangular supporting frame shown in (20) of FIG. 1. The top-level shelve (21a) is for a round reactor to grow microalgae symbiotically with fish. The middle-level shelve (21b) is for a round reactor to grow live food animals. The bottom-level shelve (21c) is for a round reactor to grow fry in it.

As is shown in (10) and (20) of FIG. (1), both types of the supporting frames are provided by electric outlets and water faucets. In the figure, (12) and (22) are electric outlets for various accessory devices to be used to control the quality of the culture water. In the same figure, (13) and (23) are faucets to supply fresh culture water.

Figure 2:
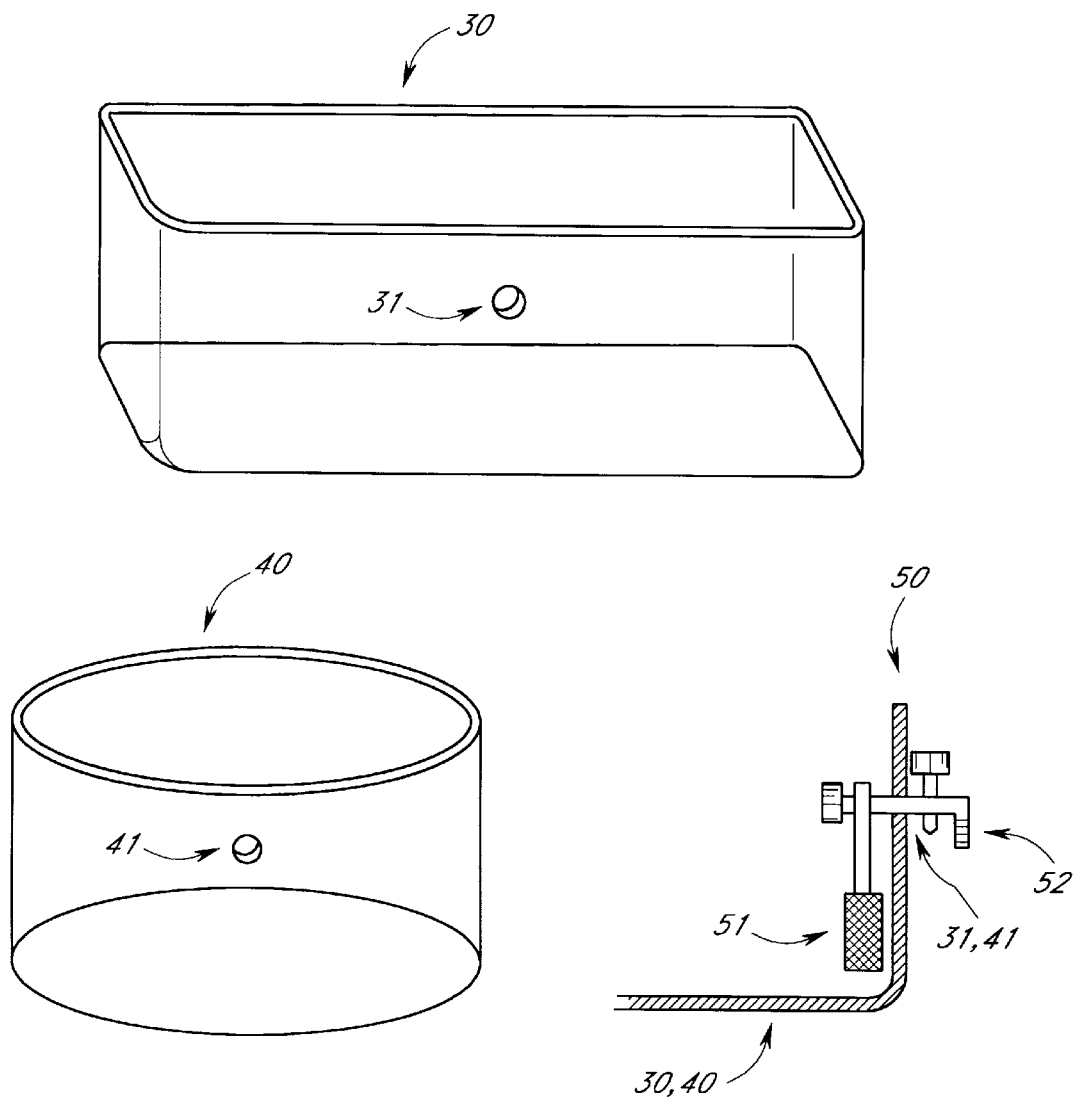

In FIG. 2, two types of reactors (30, 40) made of transparent material and a water-level controller (50) are shown. In the same figure, (30) is a rectangular reactor having a hole (31) through which a water-level controller will be installed. In the same figure, (40) is a round reactor having a hole (41) for a water-level controller. In the same figure, (50) is a water-level controller attached to the wall of reactor (30) or (40). The water-level controller is composed of a rotary arm (51) attached vertically to a body (52). The height of the arm tip from the reactor bottom determines the level of culture water. The arm tip will be covered by fine nets when needed to filter out live food animals or fry from the culture water. The outer end of the body (52) can be connected to rubber or plastic tubing for recycling the culture water, transferring the live food animals, or harvesting the fry.

Figure 3:
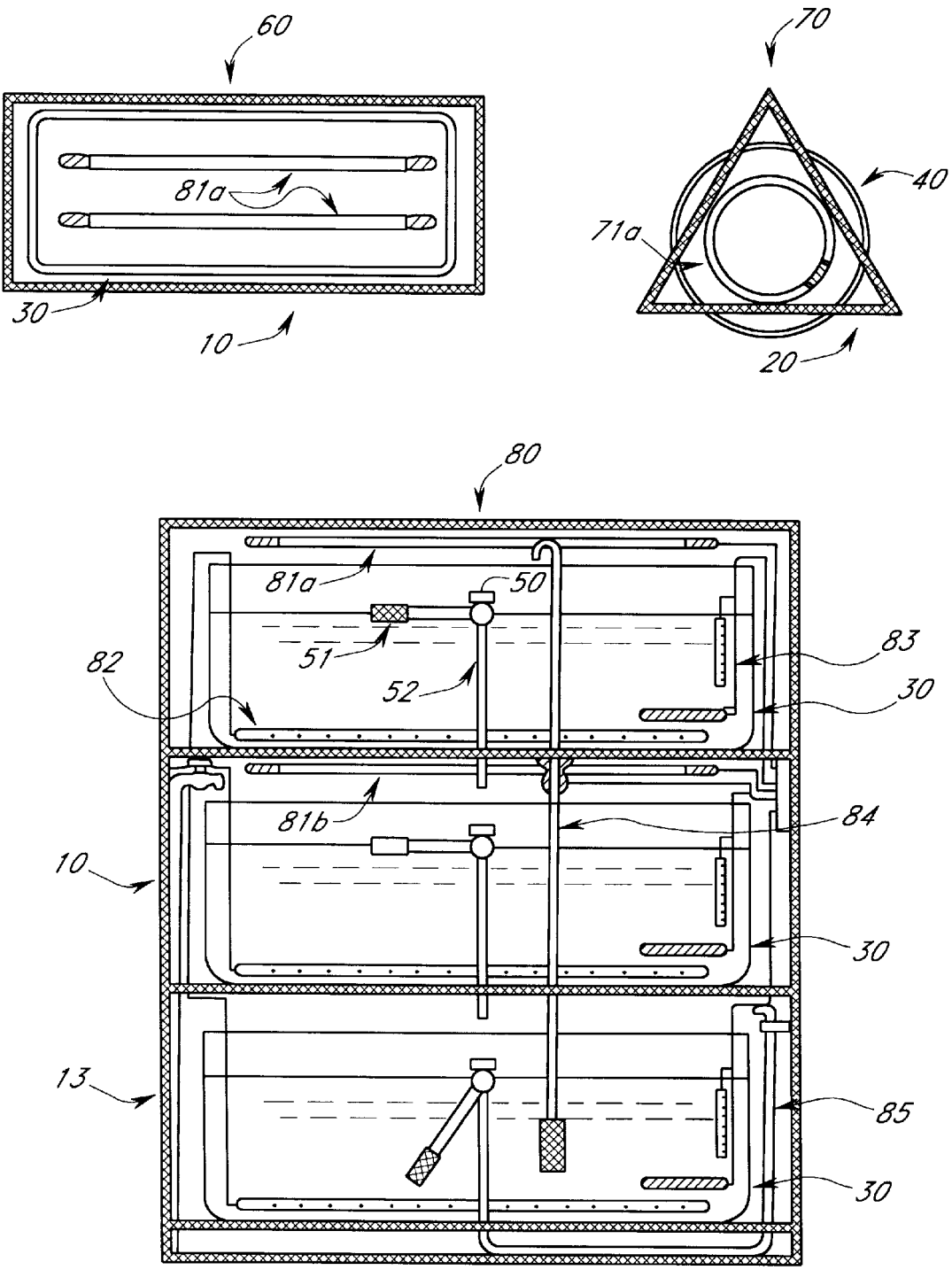
FIG. 3, (60) is a plan overview of a compact culture system with rectangular reactors installed a rectangular frame, (70) is a plan verview of acompact culture system with round reactors installed on a triangular frame, and (80) is a plan front-view of a compact culture system with rectangular reactors installed on a rectangular frame.

In FIG. 3, (60) is a plan overview of a rectangular frame culture system and (70) is a plan overview of a triangular frame culture system. The heavy lines (10) and (20) indicate the supporting frames. The narrow double lined rectangle (30) in (60) and circle (40) in (70) are reactors. The illuminators (81a) and (71a) located above the reactors are also shown. A plan front-view of the compact serial culture system installed on a rectangular supporting frame (10) is shown in (80) of FIG. 3. Three rectangular reactors (30) are located in three different levels. Operation of the culture system can be initiated by filling the middle-level reactor with fresh water through the faucet (13). When the water in the reactor reaches the water-level controller (50), the water will flow through the, arm (51) and body (52) down into the bottom-level reactor. By the time the bottom-level reactor is filled, the water-recycling pump (84) will run to fill the top-level reactor. When all the three reactors are filled, the supply of fresh water will be stopped.

In the top-level reactor, microalgae and small fish will be inoculated to start the symbiotic culture. The fish should be fed with commercial feed, but carbon dioxide and ammonia for the photosynthetic growing microalgae are self-supplied with the excreta of the fish. The top-level reactor is illuminated from above and down by upper-illuminator (81a) and bottom-illuminator (81b) to help photosynthesis of the microalgae.

When microalgae density in the top-level reactor reaches certain level, the middle-level reactor is inoculated with live food animals, and then cycling of the culture water will be started to supply the microalgae to the middle-level reactor. By the time the live food animals in the middle-level reactor reaches certain density; the bottom-level reactor is inoculated with fry to receive the live food animals. The tip of arm (51) of the water-level controller (50) in the middle-level reactor is not covered by a net so that live food animals can pass through into the bottom-level reactor. When the fry grow to certain size, they will be collected through the harvesting-tube (85) connected to the body (52) of the water-level controller (50). By lowering the end of the harvesting-tube (85) after removing the net from, the arm (51), the grown fry will flow out through, the harvesting-tube (85). The lost culture water will be replaced with fresh water through, the faucet (13).

In each reactor, an aerator (82) and a temperature-regulated heater (83) are provided as basic installation. The concentration of oxygen, carbon dioxide and ammonia as well as the level of pH in the culture water will be controlled manually, or automatically with additionally installed devices.

While the described embodiment represents the preferred embodiment of the present invention, it is to be understood that modifications will occur to those skilled in that art without departing from the spirit of the invention. The scope of the invention is therefore to be determined soly by the appended claims.

What is claimed is:

1. A culture system for growing a plurality of different living organisms, the system comprising a first reactor growing microalgae positioned above a second reactor growing live food animals positioned above a third reactor raising fish fry, wherein the microalgae grown in the first reactor are supplied to the second reactor to feed the live food animals and the live food animals grown in the second reactor are supplied to the third reactor to feed the fish fry.

2. A culture system as defined in claim 1, wherein the first reactor further raises fish symbiotically with the microalgae such that the microalgae use excreta of the fish in photosynthesis.

3. A culture system as defined in claim 1, wherein the microalgae grown in the first reactor are supplied to the second reactor only when the population of the microalgae reaches a predetermined level.

4. A culture system as defined in claim 1, wherein the live food animals grown in the second reactor are supplied to the third reactor only when the population of the live food animals reaches a predetermined level.

5. A culture system as defined in claim 1, wherein the first reactor is illuminated.

6. A culture system as defined in claim 1, further comprising a passage connecting the first and second reactors, wherein the microalgae grown in the first reactor are supplied to the second reactor through the passage.

7. A culture system as defined in claim 1, further comprising a passage connecting the second and third reactors, wherein the live food animals grown in the second reactor are supplied to the third reactor through the passage.

8. A culture system as defined in claim 1, further comprising at least one of heater and aerator to provide optimal growth environments for the living organisms grown in the reactors.

9. A culture system as defined in claim 1, further comprising at least one of oxygen-meter, carbon dioxide-meter, ammonia-meter, and PH-meter to monitor environments in the reactors.

10. A method of growing microalgae, live food animals, and fish fry which have food-chain relationships to one another, the method comprising:

growing the microalgac in a first reactor, growing the live food animals in a second reactor, and raising the fish fry in a third reactor wherein the microalgac in the first reactor are located above the second and third reactors and supplying the microalgac grown in the first reactor to the second reactor to feed the live food animals, and supplying the live food animals grown in the second reactor to the third reactor to feed the fish fry.

11. A method as defined in claim 10, further comprising: growing fish symbiotically with the microalgae such that the microalgae uses excreta of the fish in the photosynthesis.

12. A method as defined in claim 10, wherein the microalgae grown in the first reactor are supplied to the second reactor only when population of the microalage reaches a predetermined level.

13. A method as defined in claim 11, wherein the live food animals grown in the second reactor are supplied to the third reactor only when population of the live food animals reaches a predetermined level.

* * * * *